United States Patent
Bishop et al.

(10) Patent No.: US 9,209,987 B2
(45) Date of Patent: Dec. 8, 2015

(54) SOCIAL MEDIA PLAYBACK

(75) Inventors: Alan Bishop, Campbell, CA (US); Eric Soldan, Saratoga, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 975 days.

(21) Appl. No.: 12/716,146

(22) Filed: Mar. 2, 2010

(65) Prior Publication Data

US 2011/0218656 A1    Sep. 8, 2011

(51) Int. Cl.
*G06F 17/00* (2006.01)
*H04L 12/28* (2006.01)
*G06F 17/30* (2006.01)
*G11B 27/10* (2006.01)
*G11B 27/34* (2006.01)
*H04L 29/06* (2006.01)

(52) U.S. Cl.
CPC ...... *H04L 12/2823* (2013.01); *G06F 17/30017* (2013.01); *G11B 27/10* (2013.01); *G11B 27/34* (2013.01); *H04L 12/2803* (2013.01); *H04L 65/00* (2013.01); *H04L 65/4084* (2013.01); *H04L 65/602* (2013.01)

(58) Field of Classification Search
CPC .................. G06F 17/30017; H04N 21/43615; H04N 21/65; H04N 21/242; H04N 21/4302; H04N 21/4305; H04N 21/4307; H04N 21/8547
USPC ............. 700/94; 704/246; 715/200, 716, 205, 715/234
See application file for complete search history.

(56) References Cited

U.S. PATENT DOCUMENTS

| | | | |
|---|---|---|---|
| 5,808,662 A | 9/1998 | Kinney et al. | |
| 7,027,124 B2 * | 4/2006 | Foote et al. | 352/1 |
| 7,188,193 B1 | 3/2007 | Getsin et al. | |
| 7,246,367 B2 | 7/2007 | Iivonen | |
| 7,409,639 B2 | 8/2008 | Dempski et al. | |
| 8,190,680 B2 * | 5/2012 | Spilo et al. | 709/204 |
| 2004/0252400 A1 * | 12/2004 | Blank et al. | 360/70 |
| 2005/0166135 A1 | 7/2005 | Burke et al. | |
| 2006/0002681 A1 * | 1/2006 | Spilo et al. | 386/46 |
| 2007/0160972 A1 | 7/2007 | Clark | |

(Continued)

FOREIGN PATENT DOCUMENTS

CN   101390167 A   3/2009
WO   9946702 A1    9/2009

OTHER PUBLICATIONS

"Remote Synchronized Online Video Viewing: Watch Any Video in Sync with Anyone Connected Online—Best Tools", Retrieved at<< http://www.masternewmedia.org/news/2007/01/08/remote_synchronized_online_video_viewing.htm>>, Jan. 8, 2007, pp. 14.

(Continued)

*Primary Examiner* — Lun-See Lao
(74) *Attorney, Agent, or Firm* — Aaron Chatterjee; Judy Yee; Micky Minhas

(57) ABSTRACT

A method of synchronizing playback of a media asset between a first playback device and one or more other playback devices includes synchronizing an initial playback timeline of a media asset with a reference clock, and then playing the media asset with the initial playback timeline on each of the two or more playback devices. In response to a playback-alteration command, an updated playback timeline of the media asset is synchronized with the reference clock, and the media asset is then played with the updated playback timeline on each of the two or more playback devices.

20 Claims, 5 Drawing Sheets

(56) References Cited

U.S. PATENT DOCUMENTS

| | | | |
|---|---|---|---|
| 2007/0226315 A1 | 9/2007 | Espelien | |
| 2008/0015888 A1* | 1/2008 | Dang et al. | 705/1 |
| 2008/0032688 A1 | 2/2008 | Chew et al. | |
| 2008/0168470 A1 | 7/2008 | Bushell et al. | |
| 2008/0187282 A1 | 8/2008 | Brady et al. | |
| 2008/0219638 A1* | 9/2008 | Haot et al. | 386/68 |
| 2008/0307454 A1* | 12/2008 | Ahanger et al. | 725/36 |
| 2009/0055742 A1* | 2/2009 | Nordhagen | 715/716 |
| 2009/0249222 A1* | 10/2009 | Schmidt et al. | 715/751 |
| 2009/0259711 A1 | 10/2009 | Drieu et al. | |

OTHER PUBLICATIONS

Liu, et al., "Zync: the design of synchronized video sharing", Retrieved at<<http://yahooresearchberkeley.com/blog/wp-content/uploads/2007/10/liu_ztdosys_sketch-web.pdf>>, 2007, pp. 9.

Phung, et al., "Optimizing Quality for Collaborative Video Viewing", Retrieved at<<http://www1.cs.columbia.edu/~library/TR-repository/reports/reports-2004/cucs-009-04.pdf>>, 2004, pp. 8.

Williams, John, "Troubleshooting IP Broadcast Video Quality of Service," Lightwaveonline.com, <<http://www.lightwaveonline.com/test-and-measurement/troubleshooting-ip-broadcast-video-quality-of-service-53426332.html>>, Jan. 4, 2006, Retrieved date: May 7, 2010, pp. 4.

"International Search Report", Mailed Date: Sep. 28, 2011, Application No. PCT/US2011/026749, Filed Date: Mar. 1, 2011, pp. 8.

The State Intellectual Property Office of China, Second Office Action Received for Chinese Patent Application No. 201180011810 1, Mar. 25, 2015, China, 8 Pages.

State Intellectual Property Office of the People's Republic of China, First Office Action and Search Report Received for Chinese Patent Application No. 201180011810.1, Jul. 14, 2014, 15 Pages.

* cited by examiner

SOCIAL MEDIA PLAYBACK

BACKGROUND

A variety of different types of audio-visual media can be enjoyed by individual users experiencing the media alone. However, many individuals find it more enjoyable to experience media in a social setting. As an example, many people like to congregate so that a live sporting event can be viewed in the presence of friends. However, it is not always possible for individuals to congregate for social viewing in the same location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of the disclosure, a social media experience is provided for two or more playback devices. The social media experience is provided by synchronizing an initial playback timeline of a media asset with a reference clock, and then playing the media asset with the initial playback timeline on each of the two or more playback devices. In response to a playback-alteration command, an updated playback timeline of the media asset is synchronized with the reference clock, and the media asset is then played with the updated playback timeline on each of the two or more playback devices.

DETAILED DESCRIPTION

Synchronizing playback of a media asset across two or more playback devices is disclosed. The media asset is synchronized in a manner that facilitates group control of the media asset. Participating members of the group viewing the media asset from different playback devices may control the media asset for all participants. In other words, any participant in the social group may pause, fast forward, rewind, or otherwise control playback for all participants. As described in detail below, the media asset may be synchronized across the different playback devices, even when one or more participants controls playback. As such, the participants may share a social media experience in which all participants experience the media asset at the same time, even though some participants may be remotely located relative to one another.

Figure 1:
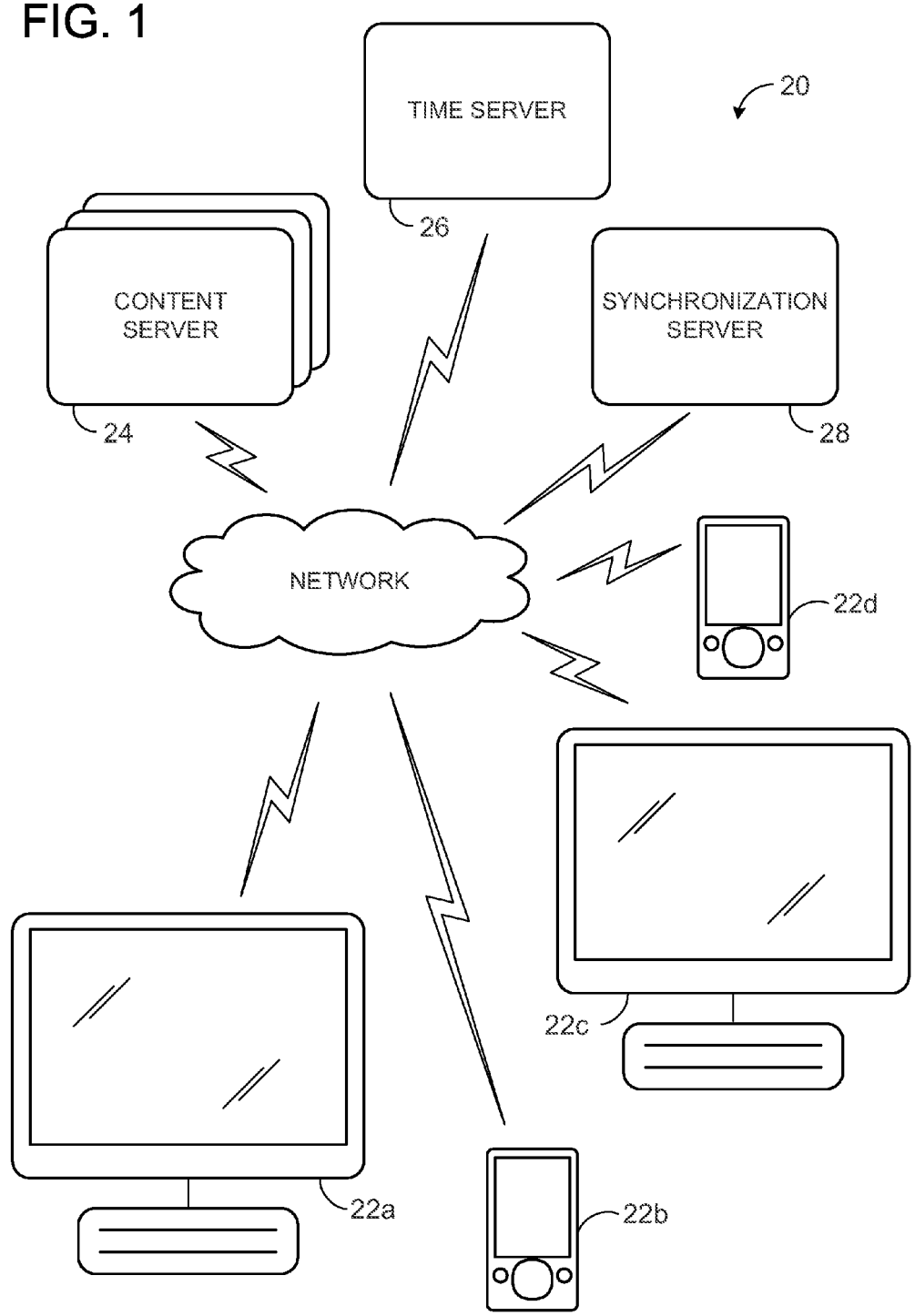
FIG. 1 shows an example environment for facilitating a social media experience.

FIG. 1 shows an example environment 20 for facilitating a social media experience. Environment 20 includes a plurality of playback devices, including playback device 22a, playback device 22b, playback device 22c, and playback device 22d. Playback devices may include televisions, set top boxes, media players, personal computers, mobile communication devices, mobile computing devices, or virtually any other networkable device capable of playing a desired media asset. For purposes of simplicity, FIG. 1 shows four playback devices. However, it is to be understood that virtually any number of playback devices may be synchronized in accordance with the present disclosure.

Playback devices may be configured to play a variety of different types of media assets. Nonlimiting examples of media assets that can be played include audio-visual media assets (e.g., movies, live television broadcasts, photo slide shows, etc.) acquired from a removable media (e.g., a digital versatile disk), audio-visual media assets downloaded from a network communication partner, and audio-visual media assets streamed from a network communication partner. While described below primarily in the context of audio-visual media assets in the form of movies, it is to be understood that the present disclosure is equally applicable to other media assets, including, but not limited to, audio-only assets (e.g., songs), video-only assets, photo slide shows, and multimedia presentations.

The playback synchronization described herein is compatible with a variety of different playback devices and a variety of different types of media assets. Furthermore, the playback synchronization described herein is not limited to specialized playback applications that are specially designed to synchronize a particular type of media asset in a limited number of usage scenarios. To the contrary, the herein described synchronization methodology may be layered with virtually any existing playback technology that is designed for unsynchronized playback on a single playback device. In this way, existing playback devices that are not originally intended to provide synchronized playback may be adapted to provide a social media experience.

As shown in FIG. 1, environment 20 includes a content server 24. In some scenarios, content server 24 may upload a media asset to one or more client devices before such media devices play the media asset. In some scenarios, content server 24 may stream a media asset to one or more playback devices. It is to be understood that playback devices may access media assets from a variety of different content servers, using a variety of different communication channels and/or asset delivery formats and protocols. Nonlimiting examples of content servers include Internet servers, cable servers, satellite servers, and/or cellular servers.

Environment 20 includes a time server 26. As described in more detail below, time server 26 is configured to provide a reliable time reference to all participating playback devices. In some scenarios, the time server may be configured to communicate with the various playback devices so that such playback devices may synchronize internal device clocks to a master clock of the time server. However, in some scenarios, the various playback devices may synchronize clocks with each other without the use of a nonparticipant master clock and/or time server. Virtually any accurate synchronization methodology may be used. Nonlimiting examples of synchronization algorithms include Cristian's algorithm, the Berkeley Algorithm, Marzullo's algorithm, and Network Time Protocol.

Environment 20 includes a synchronization server 28. Synchronization server 28 may optionally be used to facilitate communication between participating playback devices. As described in more detail below, the participating playback devices may send playback-alteration messages to each other. In some scenarios, such messages may be sent via a synchronization server. In other scenarios, such messages may be sent peer-to-peer.

As introduced above, virtually any number of participating playback devices may share a social media experience. Furthermore, any of the participating devices may be allowed to take control of the social media experience for all participants. For purposes of simplicity, the following discussion focuses on only two playback devices. However, the below described methodology may be expanded to virtually any number of participating devices.

Figure 2:
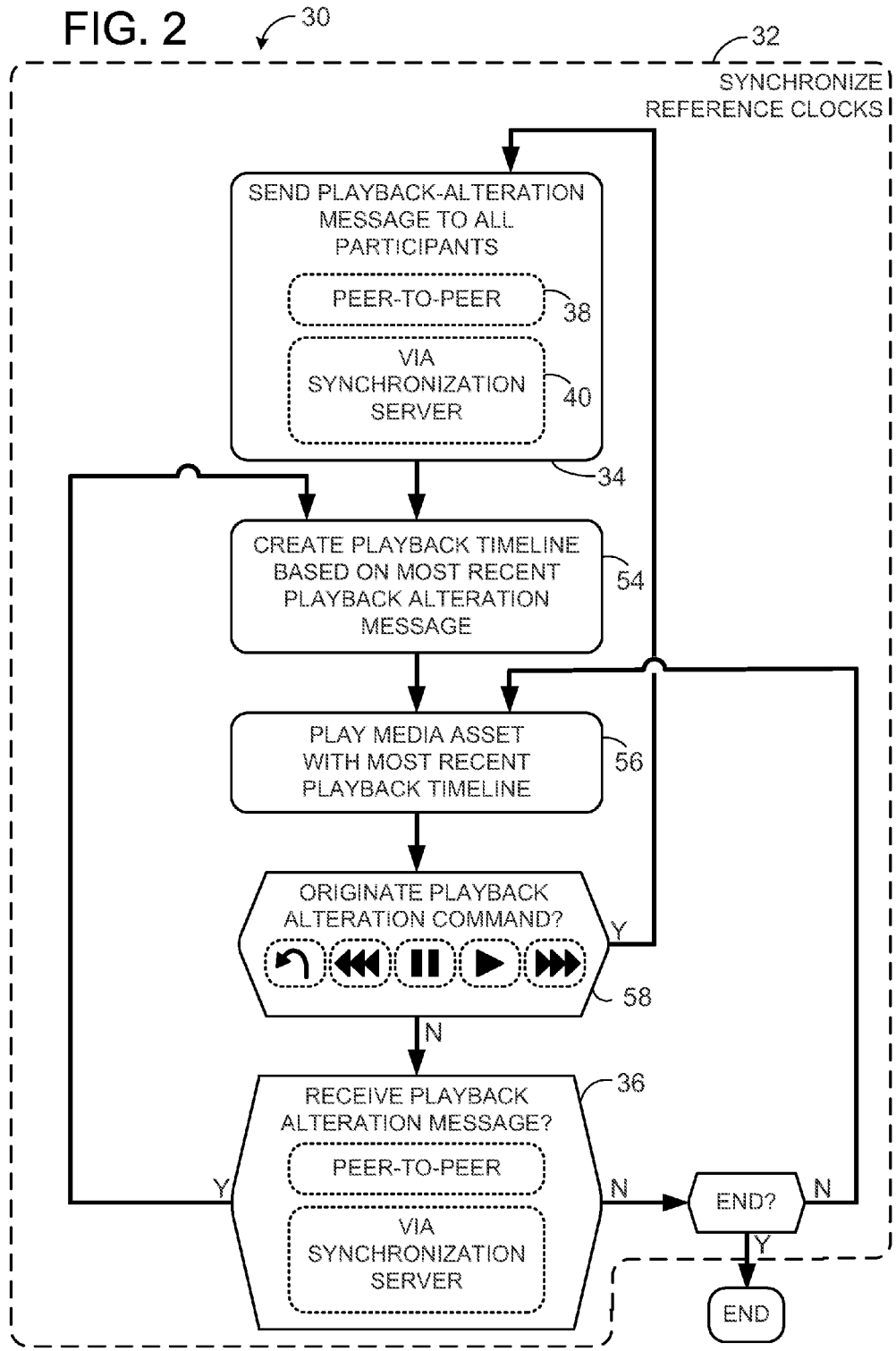
FIG. 2 shows an example method of synchronizing playback of a media asset between a first playback device and one or more other playback devices.

FIG. 2 shows an example method 30 of synchronizing playback of a media asset between a first playback device and one or more other playback devices, including a second playback device.

At 32, method 30 includes synchronizing a first reference clock accessible by the first playback device with a second reference clock accessible by the second playback device. Virtually any suitable clock synchronization system may be used. As a nonlimiting example, a device clock of the first playback device and a device clock of the second playback device may be synchronized to one or more network time servers. Clock synchronization may be maintained over time so that the reference clock accessible by the first playback device remains in sync with the reference clock accessible by the second playback device. Further, while synchronization between a first and second playback device is described for purposes of simplicity, it is to be understood that all participating playback devices can sync reference clocks.

Figure 3:
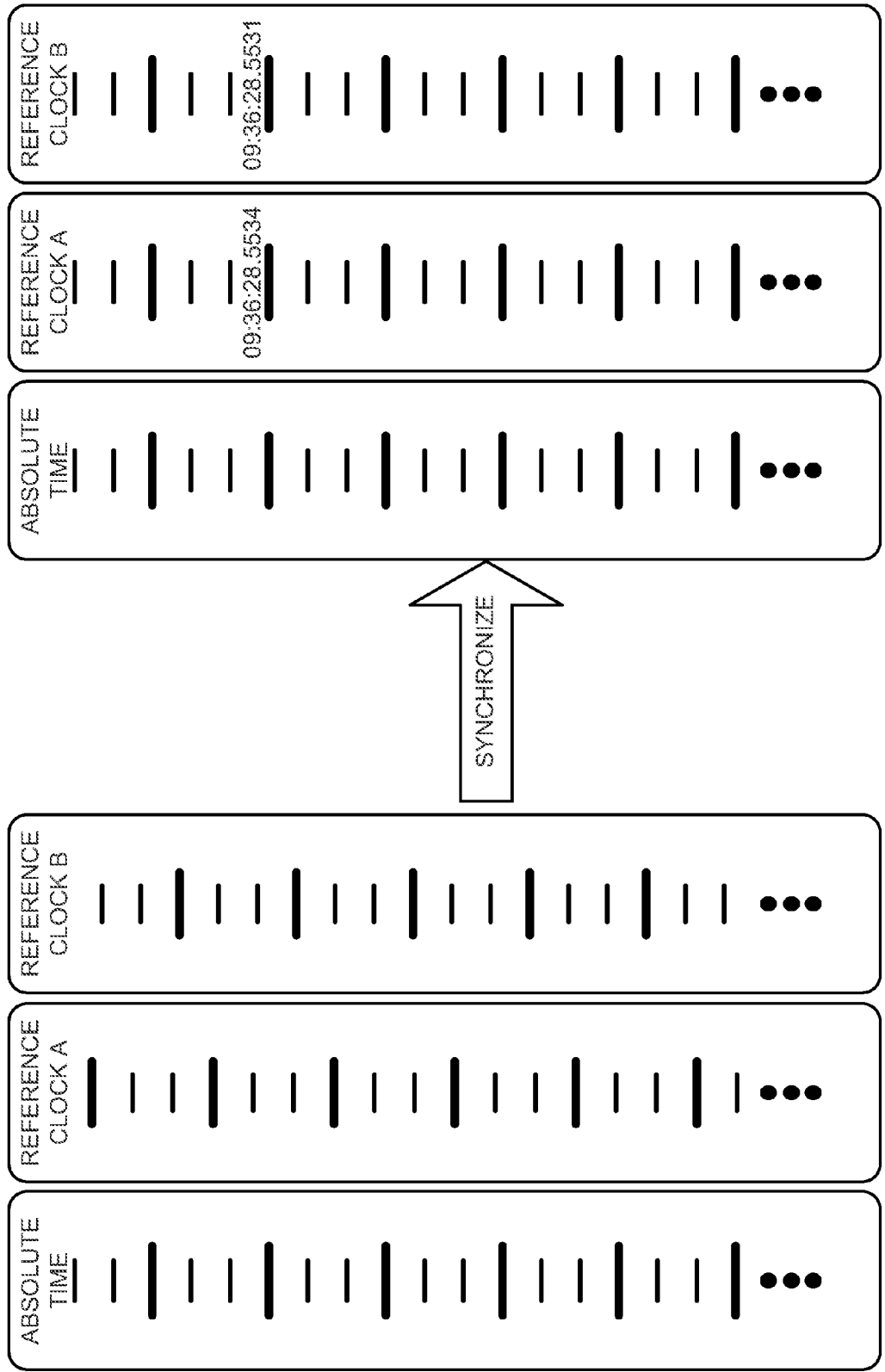
FIG. 3 schematically shows the synchronization of a first reference clock with a second reference clock.

FIG. 3 schematically shows the synchronization of a first reference clock (i.e., Reference Clock A) with a second reference clock (i.e., Reference Clock B). As shown schematically in FIG. 3, Reference Clock A and Reference Clock B are initially out of sync. After synchronization, Reference Clock A and Reference Clock B are synchronized so that a specific time (e.g., 09:36:28.5531) is counted at the same moment relative to an absolute time on both reference clocks. In some embodiments, the reference clocks may optionally be synced to Coordinated Universal Time. The level of synchronization precision may vary depending on the synchronization methods employed. While the illustrated example shows synchronization to one thousandth of a second, this is not necessarily required in all embodiments. Less precision may provide acceptable synchronization and social media experiences, and in some embodiments greater precision may be achieved.

Turning back to FIG. 2, method 30 may move to 34 if a playback device sends an initial playback alteration message, or to 36 if a playback device receives an initial playback alteration message. At 34, method 30 includes sending to the second playback device, and all other participants, a playback-alteration message originating from the first playback device. Playback-alteration messages may be sent from one playback device to other participating playback devices to inform the other participating playback devices of changes in the playback experience that are to be synchronized across all participating playback devices, or to initiate a social media experience that has not yet started.

As an example, at 34, the first playback device may send a playback-alteration message that initiates the social media experience. As a result, all other participating playback devices may receive the playback-alteration message initiating the social media experience. As indicated at 38 and 40, the playback-alteration message may be sent from the first playback device to the other playback devices as a peer-to-peer communication and/or via a synchronization server.

The playback-alteration message may include information that can be used by the playback devices to synchronize playback of a media asset across all participating devices. In some embodiments, a playback-alteration message may identify the media asset that is to be socially shared. A variety of different conventions may be used for identifying a media asset. As an example, a Uniform Resource Identifier may be used to specify a network address from where the media asset can be streamed and/or the mechanism for retrieving the media asset. As another example, TitleID metadata may be used to identify a particular media asset. Virtually any identification mechanism may be used without departing from the scope of the present disclosure.

In general, any media asset having a definite visual scene structure may be socially shared. As used herein, two media assets are considered to have the same visual scene structure if both assets show substantially equivalent scenes in the same order and with the same timing. For example, if both assets show the same opening scene of a particular movie from time 0 to time 1:34, and both assets show the same second scene of that particular movie from time 1:34 to time 2:14, and so on, then both media assets are considered to have the same definite visual scene structure.

In some embodiments, a media asset with a definite scene structure may have two or more different instances. For example, the same video content may be distributed with different audio tracks (e.g., English language audio, Spanish language audio, director commentary, etc.). As another example, video having the same scene structure may be distributed using different formats (e.g., MPEG-2, MPEG-4, H.264, VC1AP), different resolutions, different bit rates, etc. As another example, video having the same scene structure may be distributed with different ratings (e.g., an R rated version showing nudity, and a PG-13 rated version with images of nudity obscured). As another example, video having the same scene structure may be delivered as different instances of the same media asset via removable media (e.g., DVD, HD DVD, Blu Ray, etc.), network streams, network downloads, etc.

Participating playback devices may utilize different instances of a media asset when participating in a shared media experience. As an example, a set top box may stream a high definition version of a movie, a mobile communication device may stream a low resolution version of the same movie, and a personal computing device may play a previously downloaded version of the same movie.

Figure 4:
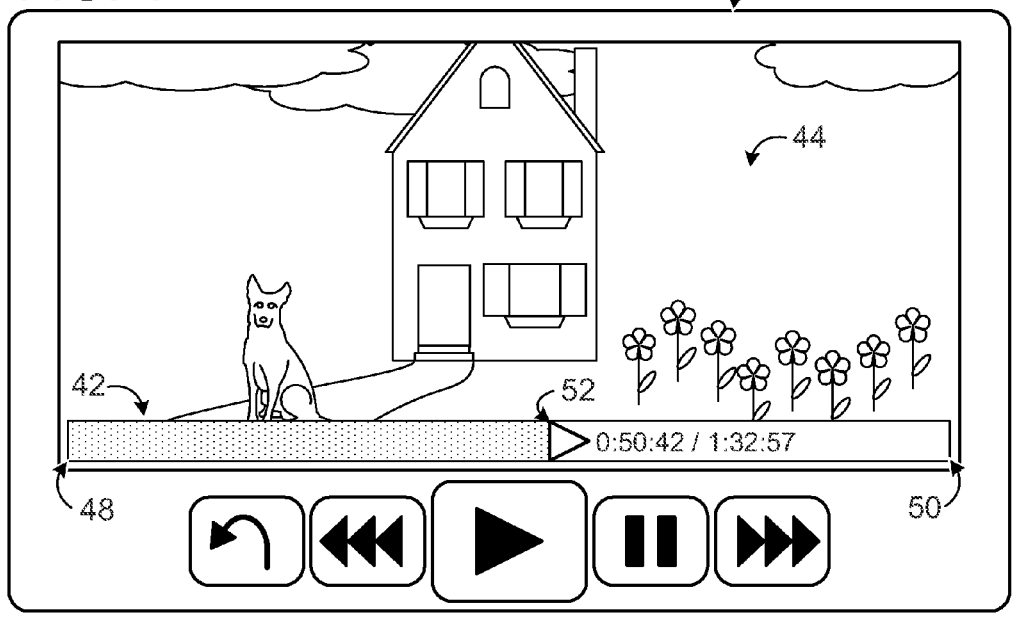
FIG. 4 schematically shows a progress timeline of a media asset that is being played by a virtual media player.

A playback-alteration message may also include a start point along a progress timeline of the media asset. FIG. 4 schematically shows a progress timeline 42 of a media asset 44 that is being played by a virtual media player 46. Progress timeline is characterized by a beginning 48 at time 0:00:00. Progress timeline is also characterized by an ending 50. For example, if media asset 44 has a total run time of 1:32:57, ending 50 will be at 1:32:57. Media asset 44 may be played at any point along progress timeline from start 48 to end 50. In the illustrated scenario, media asset 44 is shown at a current point 52 of 0:50:42.

The start point indicates the point within the media asset at which the media asset is to begin playback. For example, if a media asset is to begin playback 0:30:13.3345 into a total progress timeline of 1:32:57, the start point will be 0:30:13.3345. The example times provided herein should not be considered to limit the format and/or precision with which times may be conveyed in accordance with the present disclosure. To achieve accurate synchronization, times may be specified to the millionth of a second or with even greater precision in some embodiments. In other embodiments, less precise times may be used.

A playback-alteration message may also include a reference time when playback is to begin. For example, the playback-alteration message may specify that starting point 0:30:13.3345 of the media asset is to be played at 09:36:28.5531 of the synchronized clock (e.g., the synchronized reference time of Reference Clock A of FIG. 3). In some embodiments, the reference time may be provided with a delay from the present time to accommodate network and/or pipeline latency on one or more playback devices.

A playback-alteration message may also include a rate at which playback is to occur. As an example, if normal playback is to occur, the rate may be +1.0. In other words, one second of media is played as one second of reference time elapses. If a fast forward is to occur, the rate may be +10.0. In other words, ten seconds of media is played as one second of reference time elapses. If a rewind is to occur, the rate may be −10.0. In other words, ten seconds of media may be played in reverse as one second of reference time elapses. If a slow motion is to occur, the rate may be 0.1. In other words, one tenth of a second of media is played as one second of reference time elapses. These examples are nonlimiting. Virtually any rate may be used, and a rate may be expressed using virtually any format and/or convention.

When a playback device sends a playback-alteration message, that sending playback device acknowledges the information sent as part of the playback-alteration message. For example, a playback device acknowledges the media asset that is to be synchronized, the start point at which playback is to begin, the reference time when playback is to begin, and the playback rate at which playback is to occur. Likewise, when a playback device receives a playback-alteration message, that receiving playback device acknowledges the information received as part of the playback-alteration message. In this way, both the sending playback device and all of the receiving playback devices may acknowledge the same information, and this information may be used to synchronize the playback experience across all playback devices.

Turning back to FIG. 2, at 54, method 30 includes creating a playback timeline based on a most recent playback-alteration message. For a particular playback device, the most recent playback-alteration message can be a playback-alteration message that was sent to other playback devices or a playback-alteration message received from another playback device.

Figure 5:
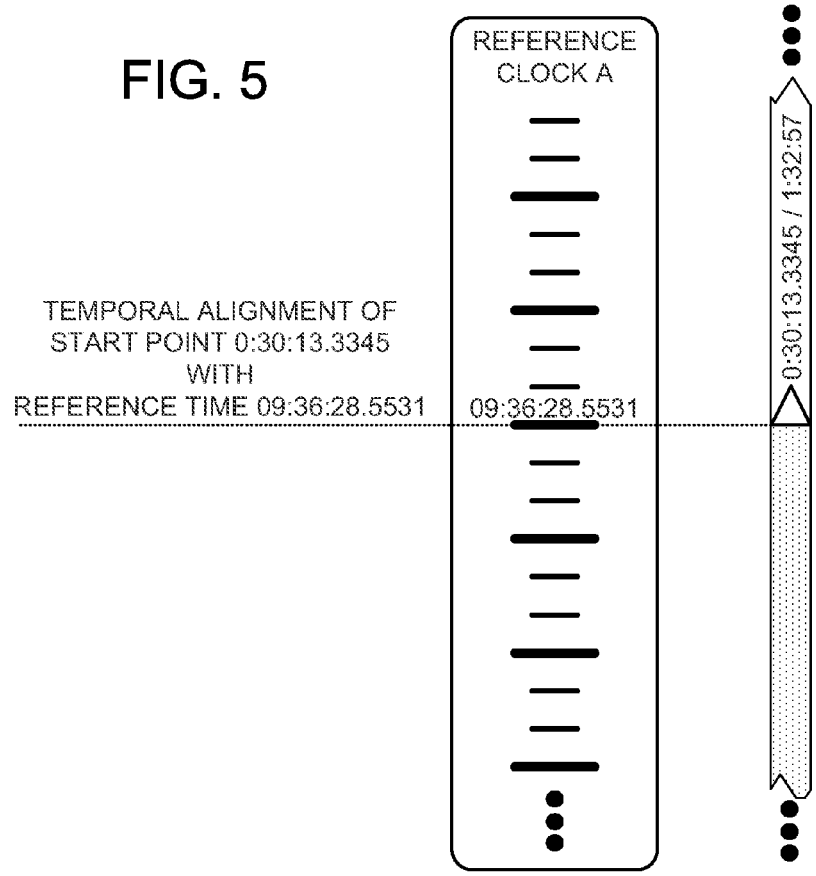
FIG. 5 schematically illustrates temporally aligning a start point of a media asset with a reference time of a reference clock.

The playback timeline may be created by temporally aligning the progress timeline of the media asset to the reference clock so that the start point specified in the playback-alteration message syncs with the reference time specified in the playback-alteration message. For example, FIG. 5 schematically illustrates temporally aligning a start point of 0:30:13.3345 with a reference time of 09:36:28.5531. The playback timeline may be set according to a playback rate specified in the playback-alteration message. For example, if a rate of +1.0 is specified, then a point ten seconds after the start point (e.g., 0:30:23.3345) will be temporally aligned with a reference time ten seconds after the reference time used to sync the timelines (e.g., 09:36:38.5531). As another example, if a rate of +10.0 is specified, then a point ten seconds after the start point (e.g., 0:30:23.3345) will be temporally aligned with a reference time one second after the reference time used to sync the timelines (e.g., 09:36:29.5531).

Each playback device may create a playback timeline in this manner. Because the reference clocks of all participating playback devices are synchronized, and because all participating playback devices are using the same information from the same playback-alteration messages to create a playback timeline, the playback timeline of each participating playback device will match the playback timeline of each other participating playback device.

Turning back to FIG. 2, at 56, method 30 includes playing the media asset with the most recent playback timeline—i.e., the playback timeline created from the most recent playback-alteration message. Each participating playback device plays the media asset with matching playback timelines. As such, the media assets are synchronized across all participating playback devices. The playback devices can use the synchronized playback timelines to ensure that a particular point in the progress timeline of a media asset is played at a particular moment as measured against the synchronized reference clocks. Even if the participating playback devices are remotely located relative to one another, the playback devices are able to play the same content at the same time.

The internal clock of a playback device may have a slightly different frequency than the internal clocks of one or more other playback devices. In order to maintain acceptable synchronization, a playback device may use any suitable synchronization methodology to mitigate synchronization mistakes that can be introduced as a result of clock drift. In some embodiments, the reference clock used by a playback device can be resynchronized with the reference clocks of all participating playback devices in response to a predetermined condition, such as a predetermined interval since the last synchronization elapsing.

The participating playback devices will maintain accurate synchronization if the reference clocks of the playback devices remain synchronized. As such, the participating playback devices may continue to play the media asset with an initial playback timeline that is synchronized to a reference clock until a new playback-alteration message is acknowledged.

As shown at 58 of method 30, a playback device may be configured to originate playback-alteration commands. If a playback-alteration command is originated by a playback device, that playback device may send an updated playback-alteration message to the other playback devices, as shown at 34. As nonlimiting examples, playback-alteration commands may include commands to pause, fast forward, rewind, play in slow motion, and/or jump to another playback point. In response to a playback-alteration command and resulting playback-alteration message, all participating playback devices may synchronize an updated playback timeline of the media asset with the reference clock. As such, all participating playback devices may play the media asset with the updated playback timeline, which is synchronized across all participating playback devices.

As shown at 34 of method 30, a playback device may send playback-alteration messages to other participating playback devices. At 36, method 30 also provides for receiving playback-alteration messages from other participating playback devices. If a playback-alteration message is received from another participating playback device, flow proceeds to 54, where an updated playback timeline may be created.

As introduced above, different instances of a media asset may be synchronized across different participating playback devices. A first instance of a media asset may be played on a first playback device while a second instance of the media asset is played on a second playback device.

In some cases, a first instance of a media asset may be delivered to a first playback device using the same delivery mechanism that is used to deliver a second instance of the media asset to a second playback device. For example, in some scenarios, the first instance of the media asset may be a local copy of the media asset saved on the first playback device and the second instance of the media asset may be a local copy of the media asset saved on the second playback device. As another example, the first instance of the media asset may be a remote copy of the media asset served to the first playback device and the second instance of the media asset may be a remote copy of the media asset served to the second playback device. In other cases, different delivery mechanisms may be used for the first and second playback devices. As an example, the first instance of the media asset may be a remote copy of the media asset served to the first playback device and the second instance of the media asset may be a local copy of the media asset saved on the second playback device.

In some cases, one or more aspects of a first instance of a media asset played by a first playback device may differ from a second instance of the media asset played by the second playback device. For example, a first instance of the media asset may be played with a first audio track on the first playback device while a second instance of the media asset may be played with a second audio track on the second playback device, the second audio track being different than the first audio track.

Furthermore, one or more instances of a media asset may be tailored to a particular playback device. For example, when the media asset is to be streamed from a media server, the media server may provide a playback device with video that is tailored to that particular playback device. In other words, a first instance of the media asset may be played with a first video quality on the first playback device while a second instance of the media asset may be played with a second video quality on the second playback device, the second video quality being different than the first video quality. As an example, a set top box may be streamed a high definition instance of a media asset while a mobile communications device is streamed a low resolution instance of the same media asset.

Furthermore, any copy protection and/or digital rights management may be individually applied to different playback devices. In other words, playback of a first instance of a media asset on a first playback device may be contingent on a first digital rights management check and playback of a second instance of the media asset on a second playback device may be contingent on a second digital rights management check. As such, content providers may limit the unauthorized playback of media assets using digital rights management schemes that are already in place.

In some embodiments, one or more playback devices may be configured to enable participant communication between playback devices. As an example, the playback devices may be configured for textual, audio-only, and/or audio-visual chatting between playback devices. As such, as participants in remote locations share the same social media experience, they may communicate with one another and discuss the social media experience. Because the media asset is synchronized across playback devices, the participants can comment on events as they occur in the media asset, thus simulating the experience of viewing the media asset with all participants in the same location.

Figure 6:
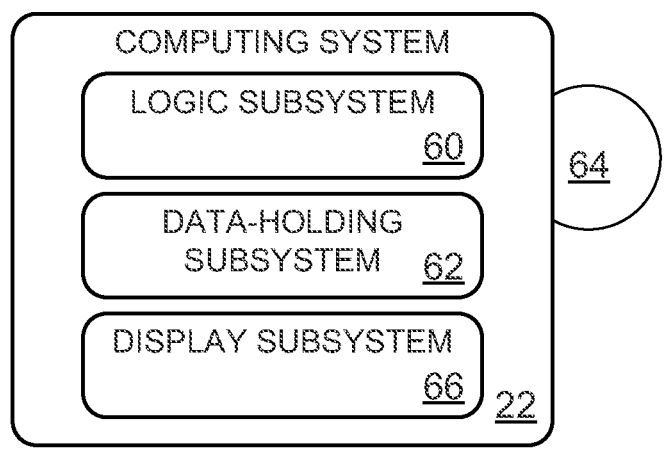
FIG. 6 shows an example computing system.

In some embodiments, the above described methods and processes may be tied to a computing system. As an example, FIG. 6 schematically shows a playback device in the form of a computing system 22 that may perform one or more of the above described media synchronization methods and processes. Computing system 22 includes a logic subsystem 60 and a data-holding subsystem 62. Computing system 22 may optionally include a display subsystem and/or other components not shown in FIG. 6.

Logic subsystem 60 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 62 may include one or more physical, non-transitory, devices configured to hold data and/or instructions executable by the logic subsystem to implement the herein described methods and processes. When such methods and processes are implemented, the state of data-holding subsystem 62 may be transformed (e.g., to hold different data). Data-holding subsystem 62 may include removable media and/or built-in devices. Data-holding subsystem 62 may include optical memory devices, semiconductor memory devices, and/or magnetic memory devices, among others. Data-holding subsystem 62 may include devices with one or more of the following characteristics: volatile, non-volatile, dynamic, static, read/write, read-only, random access, sequential access, location addressable, file addressable, and content addressable. In some embodiments, logic subsystem 60 and data-holding subsystem 62 may be integrated into one or more common devices, such as an application specific integrated circuit or a system on a chip.

FIG. 6 also shows an aspect of the data-holding subsystem in the form of computer-readable removable media 64, which may be used to store and/or transfer data and/or instructions executable to implement the herein described methods and processes. Computer-readable removable media 64 may additionally and/or alternatively be used to store and/or transfer media assets in a variety of different formats.

When included, display subsystem 66 may be used to present a visual representation of data held by data-holding subsystem 62. As the herein described methods and processes change the data held by the data-holding subsystem, and thus transform the state of the data-holding subsystem, the state of display subsystem 66 may likewise be transformed to visually represent changes in the underlying data. As one example, the visual representation of the media asset may be updated in real time in accordance with a synchronized playback timeline. Display subsystem 66 may include one or more display devices utilizing virtually any type of technology. Such display devices may be combined with logic subsystem 60 and/or data-holding subsystem 62 in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of providing a social media experience via two or more playback devices, the method comprising:
    synchronizing an initial playback timeline of a media asset with a reference clock, the initial playback timeline having an initial playback speed;
    starting playback of the media asset from a same start point with the initial playback speed of the initial playback timeline on each of the two or more playback devices;
    in response to a fast forward, rewind, or slow motion playback-alteration command, synchronizing an updated playback timeline of the media asset with the reference clock, the updated playback timeline having an updated playback speed that is different than the initial playback speed; and
    playing the media asset with the updated playback speed of the updated playback timeline on each of the two or more playback devices so as to provide a synchronized fast forward, rewind, or slow motion between each of the two or more playback devices.

2. The method of claim 1, where the playback-alteration command is communicated from one playback device to all other participating playback devices as a playback-alteration message.

3. A method of synchronizing playback of an audio/video media asset between a first playback device and one or more other playback devices, including a second playback device, the method comprising:
    synchronizing a first reference clock accessible by the first playback device with a second reference clock accessible by the second playback device;
    acknowledging the audio/video media asset that is to be synchronized on the first playback device and the second playback device;
    acknowledging a start point along a progress timeline of the audio/video media asset at which playback is to begin on the first playback device and the second playback device;
    acknowledging a reference time when playback is to begin on the first playback device;
    creating a first playback timeline for the first playback device by temporally aligning the progress timeline to the first reference clock so that the start point syncs with the reference time, the first playback timeline matching a second playback timeline for the second playback device;
    playing the audio/video media asset with a first video resolution from the start point with the first playback timeline on the first playback device while the audio/video media asset is played with a second video resolution, different than the first video resolution, from the start point with the second playback timeline on the second playback device;
    while playing the audio/video media asset on the first playback device, sending participant audio communications from the first playback device to the second playback device and/or receiving participant audio communications at the first playback device from the second playback device, the participant audio communications including an audio chat.

4. The method of claim 3, further comprising acknowledging a playback rate at which playback is to occur, where the first playback timeline is set according to a playback rate.

5. The method of claim 3, where synchronizing the first reference clock with the second reference clock includes synchronizing a device clock of the first playback device to a network time server.

6. The method of claim 3, where the audio/video media asset is an audio-visual asset having a definite visual scene structure and one or more audio tracks.

7. The method of claim 3, where the audio/video media asset has two or more different instances with different content, and where a first instance of the audio/video media asset is played on the first playback device while a second instance of the audio/video media asset is played on the second playback device.

8. The method of claim 7, where the first instance of the audio/video media asset is a local copy of the audio/video media asset saved on the first playback device and the second instance of the audio/video media asset is a local copy of the audio/video media asset saved on the second playback device.

9. The method of claim 7, where the first instance of the audio/video media asset is a remote copy of the audio/video media asset served to the first playback device and the second instance of the audio/video media asset is a remote copy of the audio/video media asset served to the second playback device.

10. The method of claim 7, where the first instance of the audio/video media asset is a remote copy of the audio/video media asset served to the first playback device and the second instance of the audio/video media asset is a local copy of the audio/video media asset saved on the second playback device.

11. The method of claim 3, where a first instance of the audio/video media asset is played with a first audio track on the first playback device while a second instance of the audio/video media asset is played with a second audio track on the second playback device, the second audio track being different than the first audio track.

12. The method of claim 3, where a first instance of the audio/video media asset is played with a first video quality on the first playback device while a second instance of the audio/video media asset is played with a second video quality on the second playback device, the second video quality being different than the first video quality.

13. The method of claim 3, where playback of a first instance of the audio/video media asset on the first playback device is contingent on a first digital rights management check and playback of a second instance of the audio/video media asset on the second playback device is contingent on a second digital rights management check, different than the first digital rights management check.

14. The method of claim 3, where acknowledging the start point and acknowledging the reference time includes receiving at the first playback device a playback-alteration message indicating the start point and the reference time, the playback-alteration message originating from the second playback device.

15. The method of claim 14, where the playback-alteration message is received via a synchronization server.

16. The method of claim 3, where acknowledging the start point and acknowledging the reference time includes sending to the second playback device a playback-alteration message indicating the start point and the reference time, the playback-alteration message originating from the first playback device.

17. The method of claim 16, where the playback-alteration message is sent via a synchronization server.

18. The method of claim 3, where the reference time includes a delay from a present time to accommodate network and/or pipeline latency on one or more playback devices.

19. The method of claim 3, where the participant communications include audio-visual chat communications.

20. The method of claim 3, where synchronization between the first playback device and the second playback device is maintained via a playback-alteration message sent as a peer-to-peer communication.

\* \* \* \* \*